(12) United States Patent
Hamilton et al.

(10) Patent No.: US 11,680,772 B2
(45) Date of Patent: Jun. 20, 2023

(54) RETICLE WITH FIBER OPTIC ILLUMINATION

(71) Applicant: Sheltered Wings, Inc., Barneveld, WI (US)

(72) Inventors: Samuel J. Hamilton, Barneveld, WI (US); David M. Hamilton, Barneveld, WI (US)

(73) Assignee: Sheltered Wings, Inc., Barneveld, WI (US)

( * ) Notice: Subject to any disclaimer, the term of this patent is extended or adjusted under 35 U.S.C. 154(b) by 0 days.

(21) Appl. No.: 16/293,278

(22) Filed: Mar. 5, 2019

(65) Prior Publication Data

US 2019/0195598 A1    Jun. 27, 2019

Related U.S. Application Data

(63) Continuation-in-part of application No. 14/742,415, filed on Jun. 17, 2015, now Pat. No. 10,900,745, which is a continuation-in-part of application No. 14/478,697, filed on Sep. 5, 2014, now abandoned.

(60) Provisional application No. 62/638,549, filed on Mar. 5, 2018, provisional application No. 61/874,840, filed on Sep. 6, 2013.

(51) Int. Cl.
| | |
|---|---|
| *F41G 1/38* | (2006.01) |
| *F41G 3/06* | (2006.01) |
| *G02B 23/14* | (2006.01) |
| *F41G 1/34* | (2006.01) |
| *F41G 1/473* | (2006.01) |

(52) U.S. Cl.
CPC ............... *F41G 1/38* (2013.01); *F41G 1/345* (2013.01); *F41G 1/473* (2013.01); *F41G 3/06* (2013.01); *G02B 23/14* (2013.01)

(58) Field of Classification Search
None
See application file for complete search history.

(56) References Cited

U.S. PATENT DOCUMENTS

| | | | |
|---|---|---|---|
| 6,981,329 B1 * | 1/2006 | Strathman | F41B 5/1419 33/265 |
| 7,877,886 B1 | 2/2011 | Hamilton | |
| 2008/0134561 A1 * | 6/2008 | Clouser | F41G 1/42 42/113 |
| 2014/0007486 A1 * | 1/2014 | Hornung | F41G 1/345 42/123 |
| 2014/0041277 A1 | 2/2014 | Hamilton | |
| 2014/0166751 A1 * | 6/2014 | Sammut | F41G 3/12 235/404 |
| 2015/0276346 A1 | 10/2015 | Hamilton et al. | |

(Continued)

OTHER PUBLICATIONS

International Search Reporting and Written Opinion for International Application No. PCT/US19/20720 dated May 17, 2019, 8 pages.

*Primary Examiner* — Christopher Stanford
*Assistant Examiner* — Journey F Sumlar
(74) *Attorney, Agent, or Firm* — Husch Blackwell LLP

(57) ABSTRACT

The disclosure relates to viewing optics, and in particular, a reticle system for a viewing optic. A reticle system having a fiber optic reticle coupled to a transparent substrate reticle in either the first or second focal plane is disclosed. The reticle system disclosed herein is visible in bright daylight and also has the desired floating features in the field of view, including numbers and other markings.

19 Claims, 12 Drawing Sheets

(56) References Cited

U.S. PATENT DOCUMENTS

2015/0323780 A1* 11/2015 Hamilton ............... G02B 23/14
359/428
2017/0038177 A1* 2/2017 Sun ......................... F41G 1/345
2017/0138698 A1 5/2017 York et al.

* cited by examiner

RETICLE WITH FIBER OPTIC ILLUMINATION

CROSS-REFERENCE TO RELATED APPLICATIONS

This application is a continuation in part application of U.S. patent application Ser. No. 14/742,415 filed Jun. 17, 2015, which is a continuation in part application of U.S. patent application Ser. No. 14/478,697 filed Sep. 5, 2014, which claims priority to U.S. Provisional Patent Application Ser. No. 61/874,840 filed Sep. 6, 2013, and a non-provisional application of U.S. Provisional Application No. 62/638,549 filed Mar. 5, 2018, which are incorporated herein by reference in their entireties for all purposes.

FIELD

The disclosure relates generally to a viewing optic for use with a firearm. More particularly, the disclosure relates to reticles for use in a viewing optic.

BACKGROUND

Reticles are used in viewing optics for aiming and for measuring distances or sizes of objects. Commonly referred to as "crosshairs," various types of reticles can be used in viewing optics, such as riflescopes. The reticle is placed at a focal plane, and carried by an erector tube. The erector tube houses both the magnifying lenses and the reticle assembly within a main tube. The erector tube moves as a shooter or spotter adjusts the scope for windage and elevation. Securing and accurately positioning the reticle within the erector tube is critical to the accuracy of the scope.

Glass etched reticles have become popular in sighting devices used in the consumer, military, and law enforcement markets. A glass etched reticle is a glass substrate with a pattern etched into the glass. Then, using a vapor deposit chamber, various substances can be deposited into the etched pattern. For black features, chrome is generally used. For "illuminated" features, titanium dioxide or sodium silicate is generally used. This fine powder reflects light from a LED, which is positioned at the edge of the reticle housing and out of view of the user, towards the user's eye, and makes the reticle pattern appear to glow so it is easy to see in low light situations.

Most viewing optics with variable magnification have two focal planes. Generally, a reticle can be placed at the first focal plane, the second focal plane or both. There are distinct advantages and disadvantages to both first and second focal plane reticles.

First focal plane reticles generally have smaller features, which usually prevents the use of wire reticles, because the wires are too big. Therefore, glass etched reticles are generally used for first focal plane reticles. The first focal plane is in front of the zoom magnification system (that is, the erector system), and thus, the reticle and image will change in size in proportion to one another: when the image gets bigger, the information on the reticle gets bigger at the same rate. One advantage to this is that any measurement marks on the reticle will be accurate at any magnification setting the user chooses.

As the image is magnified, the information on the reticle appears to get larger along with the image at the same rate, so all reticle markings will be accurate to its designed scale of measurement. One disadvantage, however, is that as the lines which make-up the reticle will get thicker to the user's eye, it may become difficult to see small targets because more of the viewable area is obscured. If the lines are made too thin, at low magnification (desirable for larger fields of view and moving targets) the lines could be too thin to be seen clearly. On the other hand, if the lines are thicker and work well at low magnification, they may appear to be too thick at higher magnifications.

In second focal plane reticles, by contrast, the advantages and disadvantages are largely the opposite of those of first focal plane reticles. Second focal plane reticles do not adjust in size or scale when the magnification of the image is changed because they are located behind the erector system. Therefore, a second focal plane reticle is generally sized for a specific magnification setting of the riflescope.

In order for the measurement marks on a second focal plane reticle to be accurate, the scope must be set at a precise magnification setting for which the given reticle is designed. In order to use the measurement marks in another magnification, therefore, the user would need to mathematically calculate the difference for accurate use. Because the thickness of the lines on a second focal plane reticle do not change with the magnification setting, the lines can be optimized for a desired thickness, and at any magnification the lines will appear the same thickness to the user's eye.

Alignment of dual focal plane reticles is also challenging. In many dual focal plane reticles, both reticles include vertical and/or horizontal stadia lines or markings including, but not limited to, "crosshair" lines. In addition, reticles also typically employ other markings including, but not limited to: subtension markings, hash marks, dots, horseshoes, or other shapes or patterns. Such markings may provide a shooter with information including, but not limited to, measuring distances, object sizes, and how to compensate for holdover and crosswinds. Including lines or markings on both reticles makes the alignment of the reticles to each other extremely important. If the reticles were to be misaligned for any reason, the user may see two sets of crosshairs and subtension marks, which would confuse and distract the shooter. Such misalignment could occur because the reticles are physically misaligned, or if the user simply turns his or her head off axis.

Another important consideration for reticles is illumination. Reticle illumination has been used for many years in traditional style riflescopes, but there have been illumination problems. A discussion of glass reticle technology will be useful background. Years ago, glass reticles were invented because they had the advantage of enabling "floating" reticle features. The term "floating," when applied to a reticle, means that any design can be placed onto the glass surface without any other physical support, that is, the designs do not need to be connected. Floating reticles are unlike wire reticles, as the latter require all the reticle features to be supported by being connected to a frame in some way, much like a stencil or a neon sign.

A glass reticle, or a reticle on a transparent substrate, makes possible any pattern that is imaginable. As noted above, glass reticle makers will etch glass with a pattern, and then fill the etched areas with various different materials, depending on different factors. Commonly, chrome is used as a material for filling the etched portion for use in non-illuminated features. For illuminated features, glass reticle makers commonly use a reflective material such as but not limited to titanium dioxide and sodium silicate. Usually, in a glass reticle there is a second piece of glass cemented over the reticle pattern to protect the pattern, thereby creating a doublet.

However, most glass illuminated reticles are not bright enough to be used in bright daylight situations because current technology cannot make them bright enough. There are exceptions to this generality, but they also have their drawbacks. Traditional reticle illumination involves the use of an LED placed at the edge of the glass reticle. The light from the LED reflects off the reflective material towards the observer's eye, and thus creates an illuminated pattern. This method results in a desirable illuminated pattern for low light situations. Titanium dioxide and sodium silicate are actually very finely ground powders of these materials. When the light from the LED hits these materials, the light scatters in all directions. Some of that light goes to the user's eye. But it is inefficient since it scatters light in all directions. The result is that not enough light is reflected for bright daylight situations.

One alternative way to provide brighter illumination is the use of light piped through an optic fiber to the center of the reticle to make a bright center dot or other shape. This is currently used in the Vortex Razor 1-6×24 scope, for example. The light piped through the optic fiber may be ambient light or may also be provided by an LED or other suitable light source. Illumination via the optic fiber with an LED results in a very bright reticle that can be seen in bright daylight, and does not dim when the user moves his/her head off axis. The problem with this design is that it can only be used in the second focal plane. The reason is that placement in the first focal plane would require the illuminated shape to be much smaller to appear the correct size to the user and it is difficult to get optic fibers sufficiently small, or at least to make the center dot small enough.

In addition, using an optic fiber is difficult to do using glass reticle technology without making the fiber optic cable visible to the observer, which obstructs the view and is distracting. Moreover, optic fibers have the drawback of only having an illuminated center dot, or chevron, or other similarly small and compact shape.

Another system used for bright illuminated patterns is diffraction grated reticles. In some instances, this technology may produce a very bright center dot. However, the problem is the manner in which the light is provided to the diffraction pattern.

U.S. Pat. No. 7,804,643 B2 discloses a prism system that reflects light to the diffraction pattern to create a bright center dot. The problem with this design is that it relies on a relatively large prism system that needs to be placed on the edge of the scope housing. This arrangement makes it difficult to put an illuminated reticle in the first focal plane because the larger housing arrangement would likely interfere with the scope turrets.

Another problem with this design is that the reticle moves much more in the first focal plane while adjusting the turrets. Because the prism functions to focus the light onto the diffraction pattern, this design requires focusing on a "moving target," meaning that the reflected light may not always be aimed properly onto the diffraction reticle pattern.

Others have used diffraction grated reticles in the first focal plane using a lens in combination with very tight tolerances. This provides the desired daylight brightness in the first focal plane, but as the user moves his/her head off axis, the brightness is lost, and in some cases the scope dims to almost black.

Although illuminated reticles have been used for many years, they have not been fully optimized. For example, the use of transparent organic light-emitting diode (OLED) screens or other electronic reticles is known, but improvements are needed for this technology. For example, U.S. Patent Application Publication No. 2013/0033746 discloses a transparent OLED screen reticle as well as other types of electronic reticles, and various electronic reticle shapes.

One problem with electronic reticles including OLED reticles, however, is that if battery power is lost, so too is the reticle. In this situation, there are no aiming options. Another disadvantage is that it can be complicated to connect the OLED screen to the magnification. Such difficulty leads to more opportunities for failure and an increase in cost and complexity.

As such, there is a need for a glass reticle with the advantages of a wire or metal reticle with fiber optic illumination. A need also exists for a reticle having improved illumination and reticle options.

SUMMARY

Figure 1:
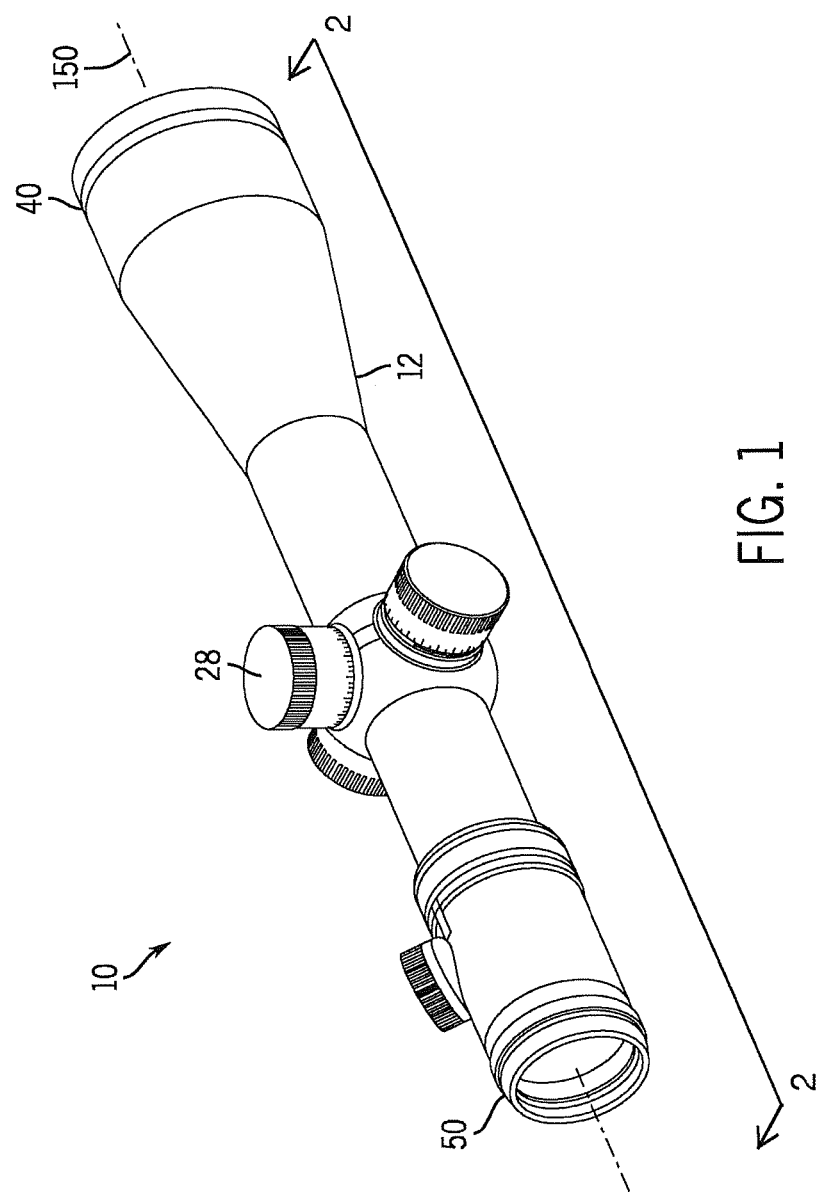
FIG. 1 is a perspective view of a viewing optic.

In one embodiment, the disclosure relates to a viewing optic having a reticle system with a fiber optic reticle coupled to a transparent substrate having a pattern of markings.

In one embodiment, the disclosure relates to a viewing optic having a reticle system with an illuminated wire reticle coupled to a transparent substrate having a pattern of markings.

In one embodiment, the disclosure relates to a viewing optic having a reticle system having a transparent substrate with a pattern of markings overlaid with an illuminated wire reticle.

In one embodiment, the reticle system can be in the first focal plane or the second focal plane.

In one embodiment, the fiber optic reticle is a wire reticle or an electroformed foil reticle. In one embodiment, the fiber optic reticle has a center pattern.

In one embodiment, the disclosure relates to a viewing optic having a reticle system with a fiber optic reticle coupled to a second transparent substrate, wherein the second transparent substrate is cemented over a first transparent substrate having a reticle pattern. In one embodiment, the transparent substrate is a doublet.

In one embodiment, the disclosure relates to a viewing optic having a reticle system with a fiber optic reticle coupled to a first transparent substrate having a reticle pattern, wherein a second transparent substrate is coupled to the first transparent substrate.

In one embodiment, the reticle system has a glass etched reticle and a wire reticle that has fiber optic illumination. In one embodiment, a viewing optic can have two reticle systems, with a first reticle system in the first focal plane and a second reticle system in the second focal plane.

In one embodiment, the disclosure relates to a viewing optic having a reticle system with a fiber optic reticle and a glass reticle, wherein the fiber optic reticle is coupled to a second glass substrate, wherein the second glass substrate is cemented over a first glass substrate having a reticle pattern. In one embodiment, the glass reticle is a doublet.

In one embodiment, the fiber optic reticle is coupled to the objective side of the glass substrate (side facing toward the objective lens assembly). In one embodiment, the fiber optic reticle is coupled to the ocular side of the glass substrate (side facing toward the eyepiece assembly).

In one embodiment, the disclosure relates to a viewing optic having a reticle system with a fiber optic reticle coupled to a first glass substrate having a reticle pattern, wherein a second glass substrate is coupled to the first transparent substrate.

In one embodiment, the fiber optic reticle is coupled to the substrate that has the reticle pattern. In still another embodiment, the fiber optic reticle is coupled to a second substrate that covers a first substrate having a reticle pattern.

In one embodiment, the disclosure relates to a viewing optic comprising: a body with a first end and a second end and having a center axis; an objective lens system disposed within the body; an eyepiece lens disposed within the body; an erector lens system disposed within the body; the objective lens system, eyepiece lens, and erector lens system forming an optical system having a first focal plane and a second focal plane, and a reticle system having a fiber optic reticle coupled to a glass etched reticle having at least horizontal and vertical stadia lines. In one embodiment, the reticle system comprises a metal or wire reticle with illumination.

In one embodiment, the disclosure relates to a viewing optic comprising: a body with a first end and a second end and having a center axis; an objective lens system disposed within the body; an eyepiece lens disposed within the body; an erector lens system disposed within the body; the objective lens system, eyepiece lens, and erector lens system forming an optical system having a first focal plane and a second focal plane; and a reticle system having a fiber optic reticle with horizontal and vertical stadia lines coupled to a transparent substrate having a reticle pattern, wherein the fiber optic horizontal and vertical stadia lines align with the transparent substrate horizontal and vertical stadia lines.

In one embodiment, the disclosure relates to a viewing optic comprising: an objective lens system; an erector system; an eyepiece; a reticle system having a fiber optic reticle including horizontal and stadia lines coupled to a glass reticle having a marking pattern that is void of horizontal and vertical stadia lines; wherein the marking pattern of the glass etched reticle is superimposed on the stadia lines of the wire reticle when the reticles are viewed through the eyepiece.

In one embodiment, the transparent substrate is a glass substrate.

In one embodiment, the fiber optic reticle is coupled to an objective side of the glass etched reticle or transparent substrate.

In one embodiment, the glass etched reticle or transparent substrate further includes at least one subtension marking or mil dot markings.

In one embodiment, the glass etched reticle or transparent substrate further comprises a complete reticle pattern.

In one embodiment, the fiber optic reticle includes at least one stadia line. In another embodiment, the fiber optic reticle includes at least one target dot. In yet another embodiment, the at least one target dot is illuminated by an LED.

In one embodiment, the fiber optic has a first end and a second end, wherein light enters the first end and illuminates the second end.

In yet another embodiment, the fiber optic includes a light collector at the first end. In another embodiment, the second end of the fiber optic reticle includes an angled cut wherein the light reflects off of the angled cut.

In still another embodiment, the fiber optic is aligned with and tracks along a stadia line of the wire reticle.

In one embodiment, the fiber optic reticle has at least one target dot illuminated by an LED, and further wherein the optic fiber has a first end and a second end, the first end including a light collector and the second end including an angled cut wherein the light from the LED passes through the optic fiber and reflects off of the angled cut.

In one embodiment, the disclosure relates to viewing optic having a reticle that is visible in bright daylight against bright backgrounds, along with floating features in the field of view, including numbers or dots.

In one embodiment, the disclosure relates to a reticle with a bright spot at the center that is visible in bright daylight against bright backgrounds, along with floating features in the field of view, such as numbers or dots.

In one embodiment, the disclosure relates to a reticle that combines the advantages of a glass etched reticle with the advantages of fiber optic illumination.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

DETAILED DESCRIPTION

The apparatuses and methods disclosed herein will now be described more fully hereinafter with reference to the accompanying drawings, in which embodiments of the disclosure are shown. The apparatuses and methods disclosed herein may, however, be embodied in many different forms and should not be construed as limited to the embodiments set forth herein. Rather, these embodiments are provided so that the disclosure will be thorough and complete and will fully convey the scope of the invention to those skilled in the art.

It will be appreciated by those skilled in the art that the set of features and/or capabilities may be readily adapted within the context of a standalone weapons sight, front-mount or rear-mount clip-on weapons sight, and other permutations of filed deployed optical weapons sights. Further, it will be appreciated by those skilled in the art that various combinations of features and capabilities may be incorporated into add-on modules for retrofitting existing fixed or variable weapons sights of any variety.

It will be understood that when an element or layer is referred to as being "on", "connected to" or "coupled to" another element or layer, it can be directly on, connected or coupled to the other element or layer. Alternatively, intervening elements or layers may be present. In contrast, when an element is referred to as being "directly on," "directly connected to" or "directly coupled to" another element or layer, there are no intervening elements or layers present.

Like numbers refer to like elements throughout. As used herein, the term "and/or" includes any and all combinations of one or more of the associated listed items.

It will be understood that, although the terms first, second, etc. may be used herein to describe various elements, components, regions, and/or sections, these elements, components, regions, and/or sections should not be limited by these terms. These terms are only used to distinguish one element, component, region, or section from another element, component, region, or section. Thus, a first element, component, region, or section discussed below could be termed a second element, component, region, or section without departing from the disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

I. Definitions

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, etc., is from 100 to 1,000, it is intended that all individual values, such as 100, 101, 102, etc., and sub ranges, such as 100 to 144, 155 to 170, 197 to 200,etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, distances from a user of a device to a target or from one component of a device to another component of a device.

The term "and/or" as used in a phrase such as "A and/or B" herein is intended to include both A and B; A or B; A (alone); and B (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, a "center pattern" describes any pattern that can be used advantageously for close range shooting. A center pattern may be simply a center dot, broken circle, horseshoe, or any pattern that is considered easy to use as an aiming point for close range shooting. This center pattern needs to be very bright so that it can be seen in bright daylight situations and against the brightest of backgrounds. For this reason, scopes that have been very popular for close range shooting include scopes with a very bright center dot or "center pattern" for an aiming point.

As used herein, a "complete reticle pattern" refers to a reticle pattern having sufficient markings that no further information from additional reticles is needed. In one embodiment, a complete reticle pattern includes horizontal and vertical stadia lines along with one or more additional markings including but not limited to subtension markings, numbers, and symbols.

As used herein, an "erector sleeve" is a protrusion from the erector lens mount which engages a slot in the erector tube and/or cam tube or which serves an analogous purpose. This could be integral to the mount or detachable.

As used herein, an "erector tube" is any structure or device having an opening to receive an erector lens mount.

As used herein, a "firearm" is a portable gun, being a barreled weapon that launches one or more projectiles often driven by the action of an explosive force. As used herein, the term "firearm" includes a handgun, a long gun, a rifle, shotgun, a carbine, automatic weapons, semi-automatic weapons, a machine gun, a sub-machine gun, an automatic rifle, and an assault rifle.

As used herein, the term "viewing optic" refers to an apparatus used by a shooter or a spotter to select, identify or monitor a target. The "viewing optic" may rely on visual observation of the target, or, for example, on infrared (IR), ultraviolet (UV), radar, thermal, microwave, or magnetic imaging, radiation including X-ray, gamma ray, isotope and particle radiation, night vision, vibrational receptors including ultra-sound, sound pulse, sonar, seismic vibrations, magnetic resonance, gravitational receptors, broadcast frequencies including radio wave, television and cellular receptors, or other image of the target. The image of the target presented to the shooter by the "viewing optic" device may be unaltered, or it may be enhanced, for example, by magnification, amplification, subtraction, superimposition, filtration, stabilization, template matching, or other means. The target selected, identified or monitored by the "viewing optic" may be within the line of sight of the shooter, or tangential to the sight of the shooter, or the shooter's line of sight may be obstructed while the target acquisition device presents a focused image of the target to the shooter. The image of the target acquired by the "viewing optic" may be, for example, analog or digital, and shared, stored, archived, or transmitted within a network of one or more shooters and spotters by, for example, video, physical cable or wire, IR, radio wave, cellular connections, laser pulse, optical, 802.11b or other wireless transmission using, for example, protocols such as html, SML, SOAP, X.25, SNA, etc., Bluetooth™, Serial, USB or other suitable image distribution method. The term "viewing optic" is used interchangeably with "optic sight."

As used herein, the term "outward scene" refers to a real world scene, including but not limited to a target.

As used herein, the term "shooter" applies to either the operator making the shot or an individual observing the shot in collaboration with the operator making the shot.

II. Viewing Optic

Figure 2:
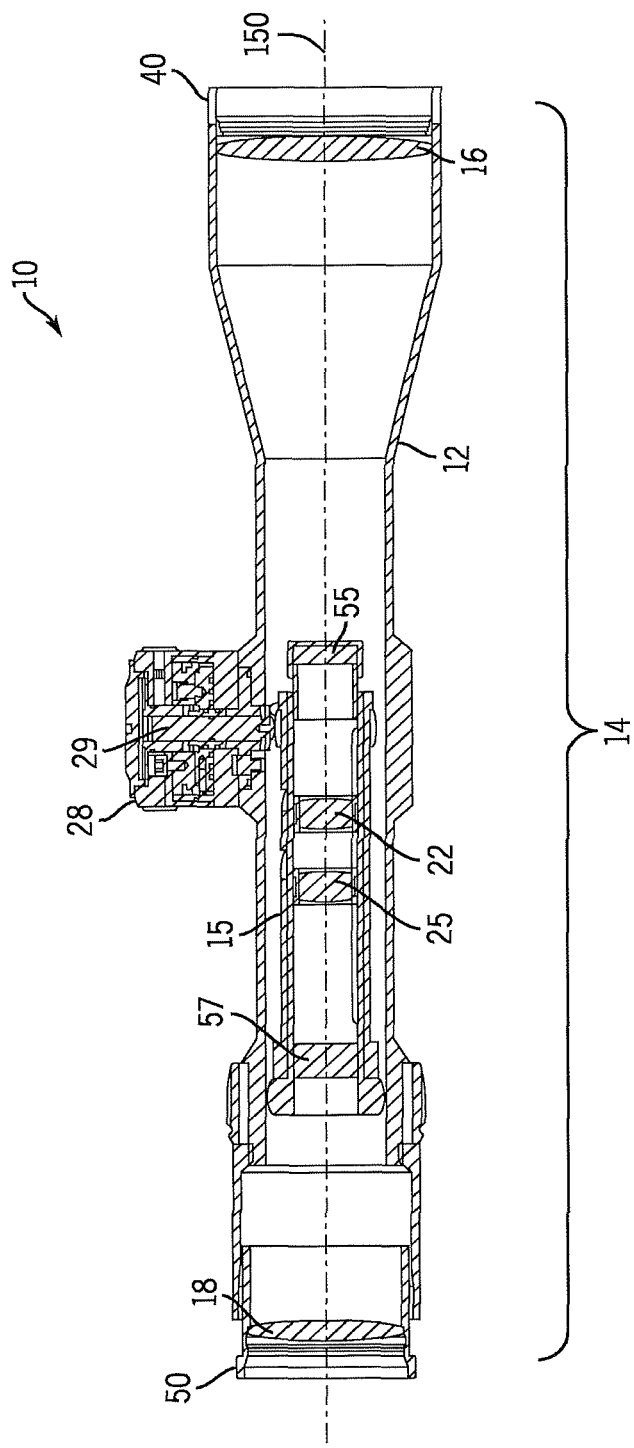
FIG. 2 is a cross-section view of the viewing optic of FIG. 1 along line 2-2, showing a moveable optical element inside the scope body.

FIG. 1 shows an exemplary viewing optic 10, having a scope body 12, objective lens end 40 and ocular end 50. FIG. 2 shows a cross-section of the sighting device from FIG. 1 showing the basic components of optical system 14 and moveable optical element 15. As shown in FIG. 2, optical system 14 includes an objective lens system 16, erector system 25, and eyepiece 18. FIG. 2 shows a riflescope having a body 12, but optical system 14 could be used in other types of sighting devices as well. Erector system 25 may be included within a moveable optic element 15. In FIG. 2, moveable optic element 15 also includes a collector 22, as well as first focal plane reticle 55 and second focal plane reticle 57. When in use, adjustment of turret assembly 28 and turret screw 29 causes adjustment of moveable optic element 15.

Figure 3:
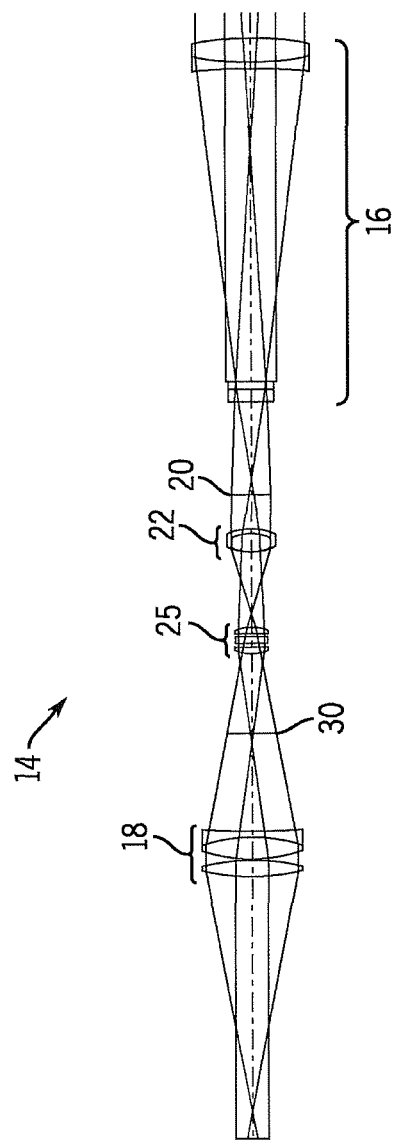
FIG. 3 is a schematic view of the erector system in the optical element of a viewing optic.

FIG. 3 shows a close-up view of an optical system 14 in cross-section, illustrating how light rays travel through the optical system 14. Optical system 14 may have additional optical components such as collector 22, and it is well known within the art that certain components, such as objective lens system 16, erector system 25, and eyepiece 18 may themselves have multiple components or lenses. Optical system 14 shown here is drawn as a basic system for illustration of one embodiment of the invention but it should be understood that variations of other optical systems with more or less structural components would be within the scope of the invention as well.

III. Reticle System

In one embodiment, the disclosure relates to a viewing optic with a reticle system having a transparent substrate etched with a desired pattern, e.g. crosshairs, and a fiber optic reticle coupled to the transparent substrate. In one embodiment, the reticle system can be in the first focal plane or the second focal plane. In one embodiment, the viewing optic may have a reticle system in both the first focal plane and the second focal plane.

A. Transparent Substrate

In one embodiment, the transparent substrate has a first side facing the objective lens and a second side facing the ocular lens. In one embodiment, the transparent substrate has an objective facing side and an ocular facing side.

In one embodiment, the first side of the transparent substrate has a marking pattern or reticle useful for the user/shooter of the viewing optic. In another embodiment, the second side of the transparent substrate has a marking pattern or reticle useful for the user/shooter of the viewing optic.

In one embodiment, the marking pattern or reticle is on the objective side of the transparent substrate. In yet another embodiment, the marking pattern or reticle is on the ocular side of the transparent substrate. In one embodiment, the marking pattern or reticle is applied by any suitable method including but not limited to etching, engraving, and chromium deposit.

In one embodiment, the transparent substrate is a glass substrate including but not limited to crown glass, e.g. Schott® high transparent crown glass B270 or Schott® bor-crown glass BK7. transparent plastics, and polycarbonate.

Figure 4:
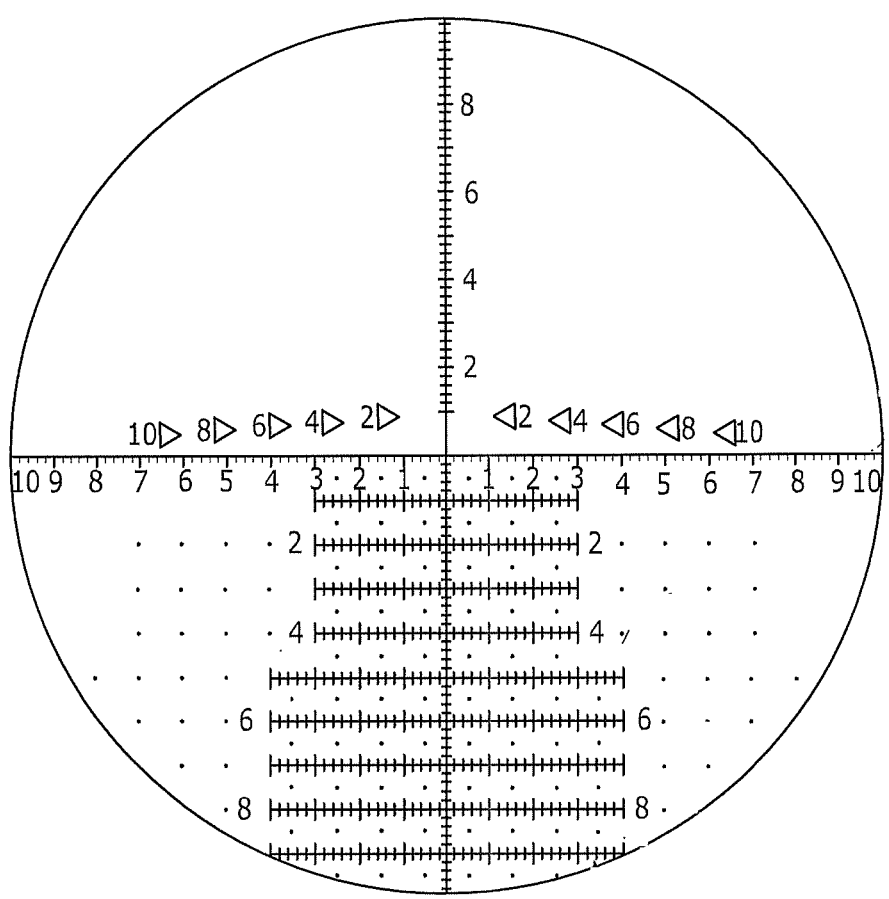
FIG. 4 is a representative schematic of markings that can be depicted on a glass etched reticle.
Figure 5:
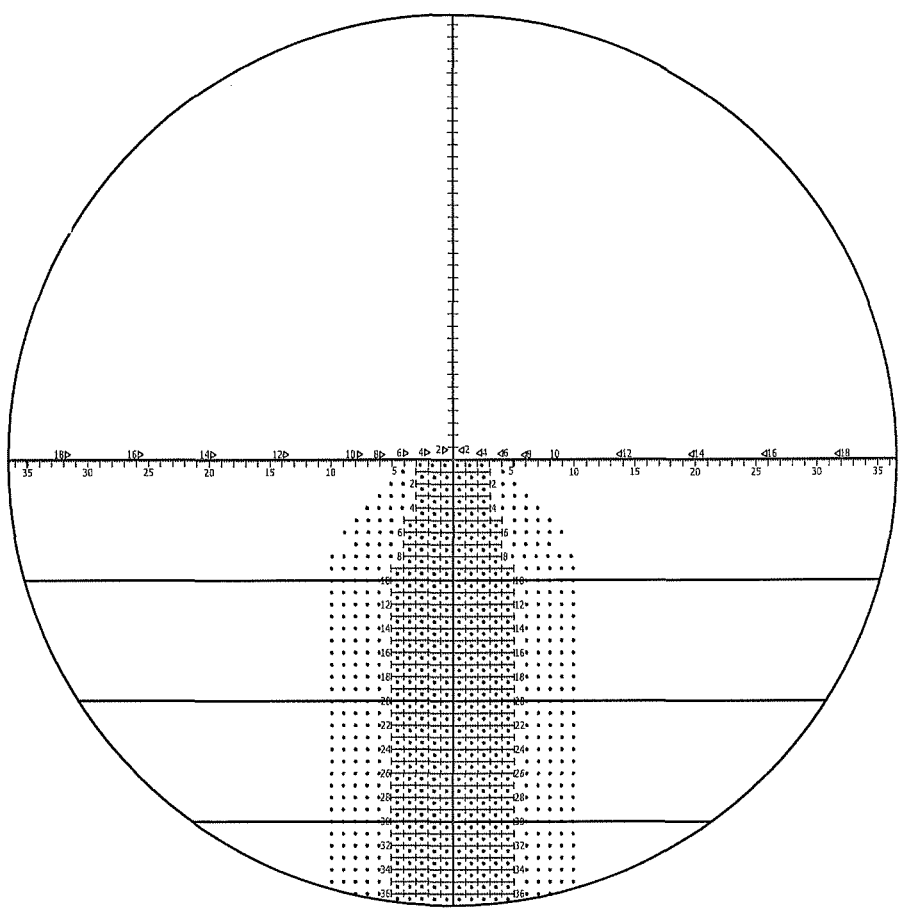
FIG. 5 is a representative schematic of markings that can be depicted on a glass etched reticle.

In one embodiment, the glass reticle can be etched with any desired pattern including but not limited to numbers, dots and other floating features. FIG. 4 and FIG. 5 provide representative examples of the types of markings that can be etched on a glass substrate.

Figure 6:
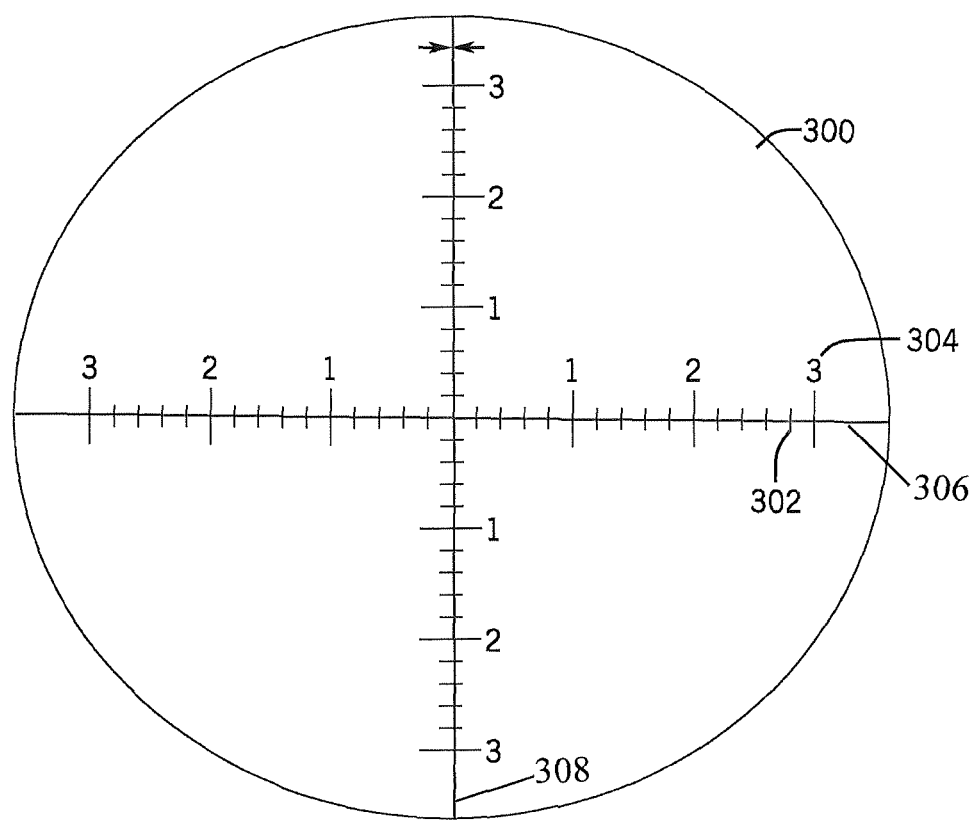
FIG. 6 is a representative view as seen through a viewing optic of a glass etched reticle.

FIG. 6 displays a glass etched reticle 300 having subtension lines 302, numbers 304 and horizontal 306 and vertical 308 stadia lines. Of course, any other suitable markings may also be included in glass etched reticle 300 without departing from the disclosure. For example, marking patterns as shown in FIGS. 4 and 5 can be etched into the glass.

In one embodiment, the transparent substrate has a full and complete reticle pattern. In yet another embodiment, the glass substrate has a full and complete reticle pattern and can function independent of any other markings.

B. Wire Reticle or Electroformed Foil Reticle

In one embodiment, the reticle system has a fiber optic wire reticle. In one embodiment, the reticle system has an electroformed foil reticle. In one embodiment, the fiber optic wire reticle has a full and complete marking pattern that can function independent of any other marking patterns.

In one embodiment, the fiber optic wire reticle can be coupled to the transparent substrate having markings or a reticle pattern. By coupling the wire reticle to the transparent substrate, the markings remain in alignment.

In one embodiment, the fiber optic wire reticle can be coupled to the objective side of the transparent substrate. In another embodiment, the fiber optic wire reticle can be coupled to the ocular side of the transparent substrate. In still another embodiment, a first fiber optic wire reticle can be coupled to the ocular side of the transparent substrate and a second fiber optic wire reticle can be coupled to the objective side of the transparent substrate.

In one embodiment, the first and second fiber optic wire reticles have complete and full marking patterns. In one embodiment, the first fiber optic wire reticle and the second fiber optic wire reticle have marking patterns that are complementary to one another.

In one embodiment, the fiber optic wire reticle can be coupled to the transparent substrate using epoxy, resin, cement, or any other suitable material. In one embodiment, the wire reticle is coupled to a first side of the transparent substrate. In yet another embodiment, the wire reticle is coupled to as second side of the transparent substrate.

In one embodiment, the fiber optic wire reticle can be cemented to the transparent substrate. In one embodiment, the fiber optic wire reticle can be coupled at the edge of the glass reticle, to avoid any material getting on the glass that is within the field of view of the reticle.

Figure 7A:
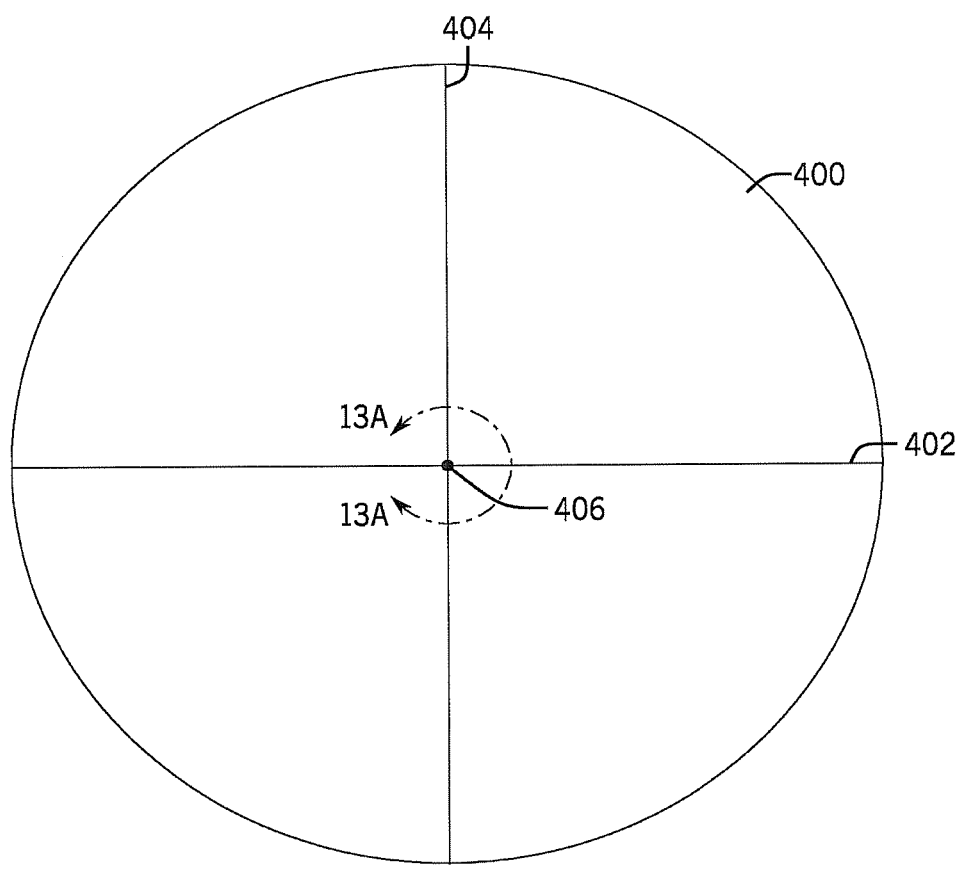
FIG. 7A is a representative view as seen through a viewing optic of a wire reticle having a target dot.
Figure 7B:
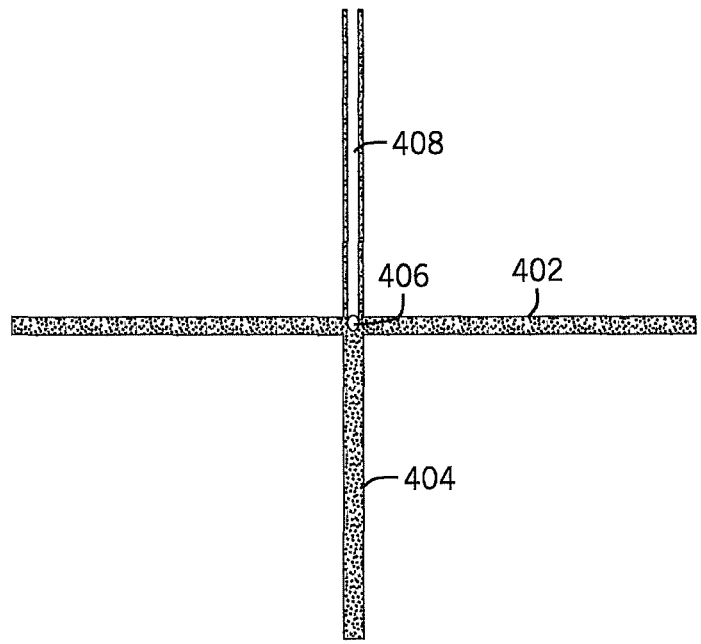
FIG. 7B is a detail schematic view of the wire reticle of FIG. 7A taken generally along the line A-A in FIG. 7A.

FIG. 7A depicts a wire reticle 400 having vertical and horizontal stadia lines 402, 404, and a target dot 406. Wire reticle 400 may include an illuminated target dot 406. As shown in FIG. 7B, illuminated target dot 406 may be illuminated by an optic fiber 408, which may be aligned with and track along one of the stadia lines 402, 404. The optic fiber 408 shown in FIG. 7B is exaggerated to make it visible in the illustration, but in practice, the optic fiber appears to disappear into the wire stadia line 402, 404 and, except for the illuminated target dot 406, is not visible to the user. Although in the embodiment shown, optic fiber 408 is positioned in front of vertical stadia line 404, it may be positioned in front of the horizontal stadia line 402 or any other wire included in wire reticle 400 without departing from the disclosure.

Figure 7C:
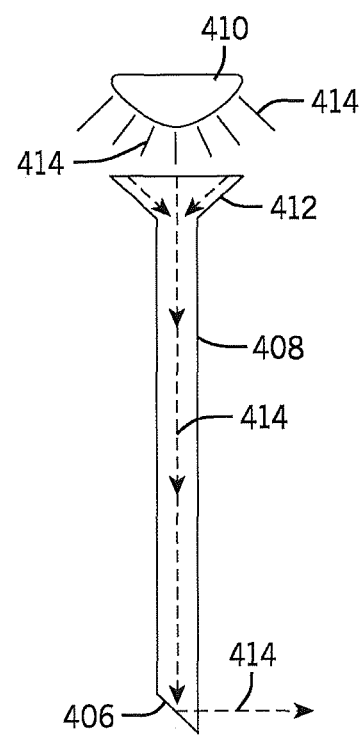
FIG. 7C is a side schematic view of one embodiment of an optic fiber target dot used with a wire reticle.

FIG. 7C shows a side view of optic fiber 408 and target dot 406, which appears as a bright dot to the user when an LED 410 is illuminated. LED 410 may be powered by a battery, and may be any suitable color. It may also be possible to provide an LED 410 that can change color, allowing the user to select a preferred color. One end of optic fiber 408 may optionally include a light collector 412, which acts as a funnel of sorts to capture as much light 414 as possible. The other end of optic fiber 408 is cut at a 45 degree angle, which reflects the light passing through the fiber toward the eye of the user. Light 414 is collected by light collector 412, passes through optic fiber 408, and reflects off of target dot 406, before traveling to the eye of the user. The targeting dot 406 visible to the viewer is actually light 414 reflecting off of the 45 degree cut of the end of optic fiber 408. As the light passes through optic fiber 408 and illuminates the end of the optic fiber opposite the light source. Thus, in an alternative embodiment, optic fiber 408 may include a 90° bend at the location of the target dot 406 so that the end of optic fiber 408 opposite the light source points toward the user's eye without having to cut the optic fiber at an angle.

In one embodiment, the optic fiber 408 may include from a 45° to a 90° bend at the location of the target dot 406. In another embodiment, the optic fiber 408 may include from a 60° bend to a 90° bend at the location of the target dot 406.

Although LED 410 is described here to illuminate the target dot 406 in the embodiment shown, any suitable light source may be used, such as a prism, OLED system, other non-LED lamp, or by exposing loops of optic fiber 408 to ambient light that may be collected and transmitted to target dot 406.

In one embodiment, the optic fiber 408 can be situated on the objective side of the wire reticle 400, and both can be situated on the objective face of the transparent substrate or glass substrate.

C. Transparent Substrate With Complete Marking Pattern and Fiber Optic Wire Reticle With Complete Marking Pattern FIGS. 6 and 7 illustrate a reticle system having a wire reticle coupled to a transparent substrate that achieves an illuminated reticle with the desired dots, numbers, or other floating features. Both the glass etched reticle 300 and the wire reticle 400 have complete reticle patterns, which are in alignment when viewed through viewing optic 10. The reticle system having a fiber optic reticle (FIG. 7A) coupled to a glass etched reticle (FIG. 6) can be placed in either the first focal plane or the second focal plane. The reticle system disclosed herein allows daylight bright illumination from the fiber optic wire reticle, as well as floating features, such as numbers and dots provided by the glass reticle.

Figure 8:
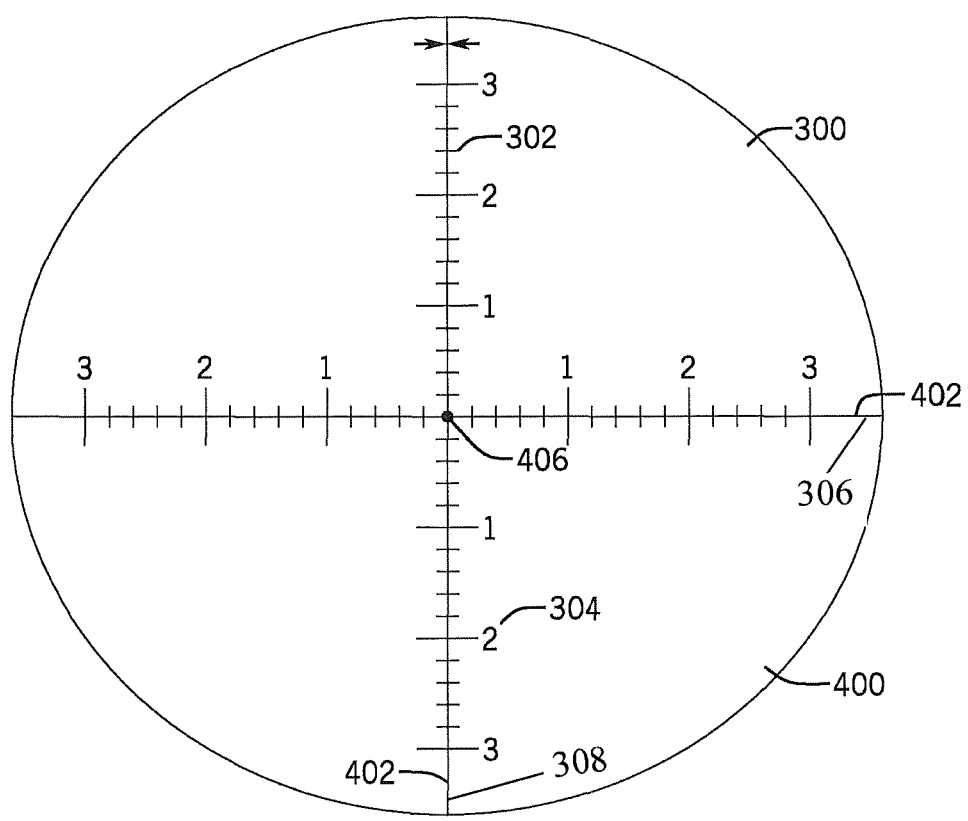
FIG. 8 is a view as seen through a viewing optic having a reticle system with a representative wire reticle of FIG. 7A coupled to a representative glass reticle of FIG. 6 in alignment.

FIG. 8 shows a view through a viewing optic 10 showing a fiber optic wire reticle 400 (FIG. 7A) coupled to glass etched reticle 300 (FIG. 6) in perfect alignment.

In one embodiment, the reticle system can be in the first focal plane or the second focal plane. In one embodiment, the disclosure relates to a viewing optic having one or more reticle systems as disclosed herein. In one embodiment, the disclosure relates to a viewing optic having a reticle system in the first focal plane and the second focal plane.

In another embodiment, the components of the reticle system can comprise complete and functional markings and complementary to one another. In one embodiment, the glass etched reticle can display a first complete and functional set of markings including horizontal and vertical stadia lines and the fiber optic wire reticle can display a second complete and functional set of markings. In one embodiment, the first and second set of markings is in alignment.

In one embodiment, the disclosure relates to a method of making a reticle system. In one embodiment, the disclosure relates to a method comprising: (a) providing a reticle pattern on a first side of a transparent substrate; (b) coupling a wire reticle with fiber optic illumination to the transparent substrate. In one embodiment, the wire reticle is coupled to the first side of the transparent substrate. In one embodiment the wire reticle is coupled to the transparent substrate at the edges of the transparent substrate.

In one embodiment, the disclosure relates to a method comprising: (a) providing a reticle pattern on an objective side of a transparent substrate; (b) coupling a wire reticle with fiber optic illumination to the transparent substrate. In one embodiment, the reticle pattern includes horizontal and vertical stadia lines.

D. Transparent Substrate with Partial Marking Pattern

In one embodiment, the disclosure relates to a viewing optic comprising: an objective lens system; an erector system; an eyepiece; a reticle system having a fiber optic reticle including horizontal and stadia lines coupled to a glass reticle having a marking pattern that is void of horizontal and vertical stadia lines; wherein the marking pattern of the glass etched reticle is superimposed on the stadia lines of the wire reticle when the reticles are viewed through the eyepiece. In one embodiment, the glass etched reticle lacks horizontal and vertical stadia lines.

Figure 9:
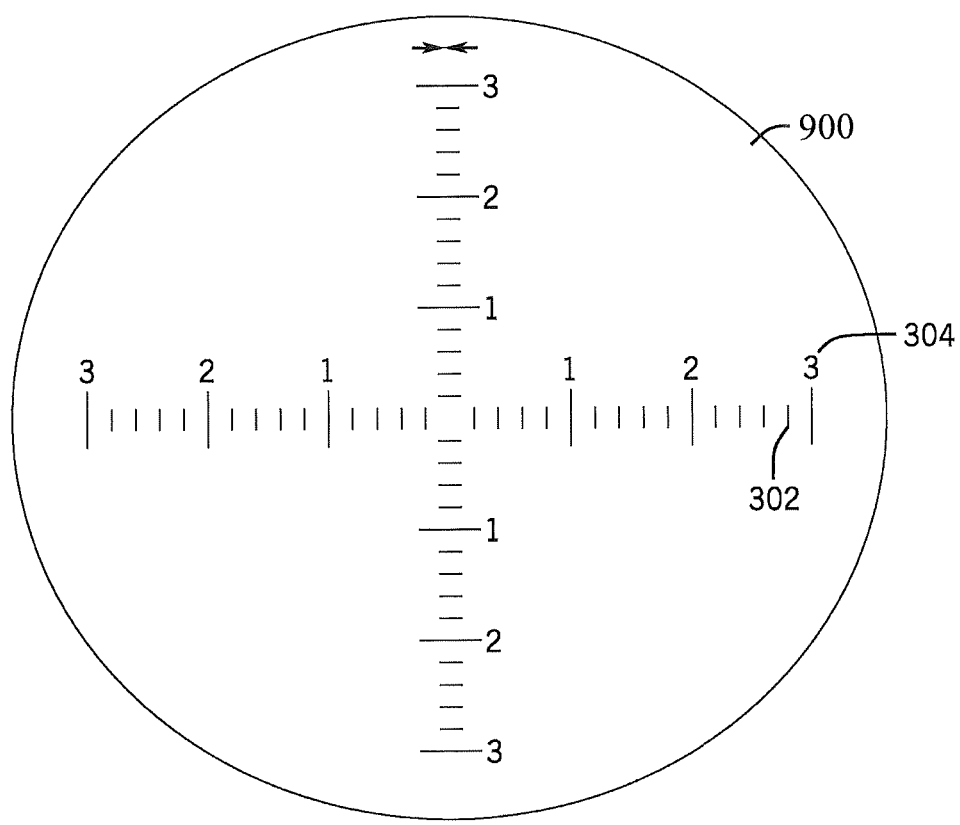
FIG. 9 is a view as seen through a viewing optic of a glass etched reticle having subtension lines and lacking stadia lines.

As an exemplary embodiment, FIG. 9 shows a glass etched reticle 900 having subtension lines 302 and numbers 304, but no stadia lines. On its own, glass etched reticle 900 would be difficult to use. The marking pattern on the transparent substrate is incomplete as it lacks stadia lines.

Figure 10:
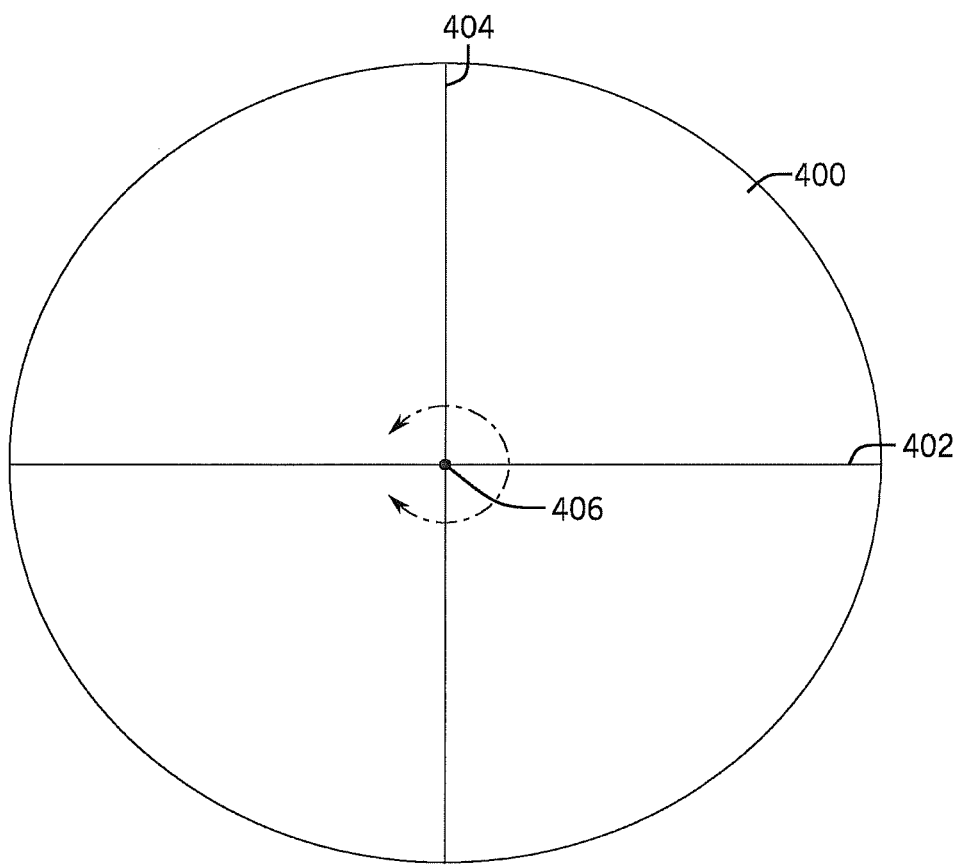
FIG. 10 is a view as seen through a viewing optic of a wire reticle having vertical and horizontal stadia lines and a target dot.

FIG. 10 shows a wire reticle 400 having vertical and horizontal stadia lines 402, 404, and a target dot 406. In one embodiment, wire reticle 400 may include an illuminated target dot 406.

Figure 11:
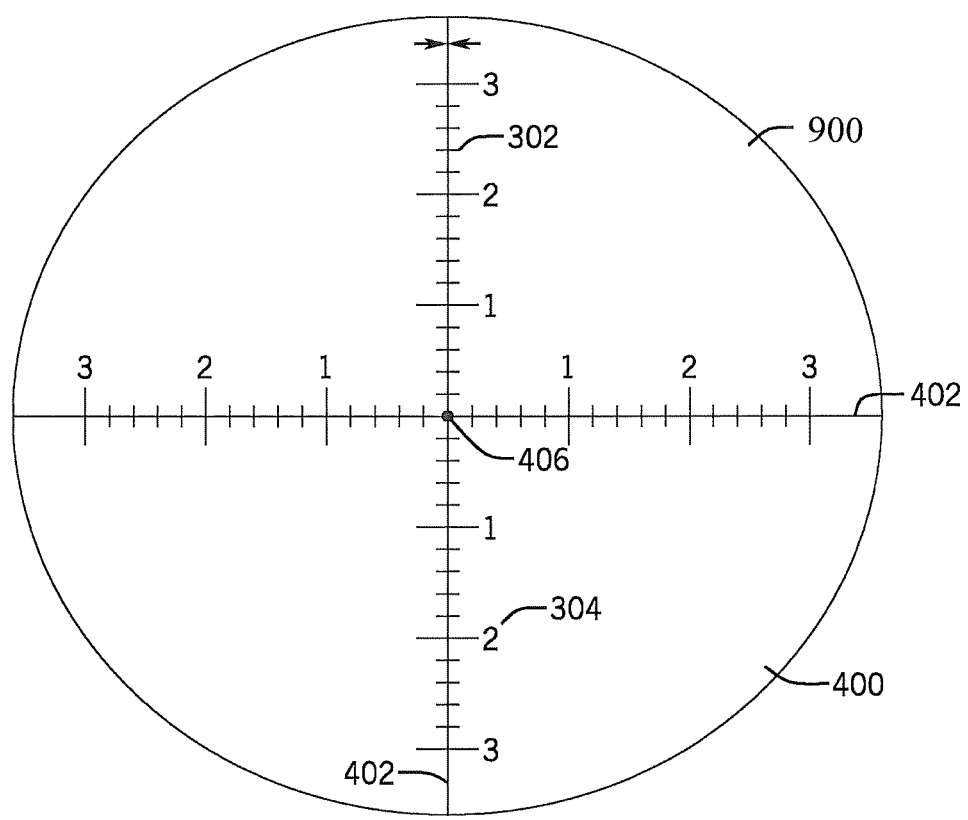
FIG. 11 is a view as seen through a viewing optic having a reticle system with a representative wire reticle of FIG. 10 coupled to a representative glass reticle of FIG. 9 in alignment.

FIG. 11 shows a view through a viewing optic 10 showing an fiber optic wire reticle 400 (FIG. 10) aligned to glass etched reticle 900 (FIG. 9). The markings on the fiber optic wire reticle complete the markings on the glass etched reticle by providing the stadia lines. Together, the fiber optic wire reticle and the glass etched reticle provide a complete marking pattern.

IV. Transparent Substrate Having Embedded Fiber Optic Illumination

In one embodiment, the disclosure relates to a transparent substrate with desired markings of a reticle pattern. In one embodiment, the horizontal and vertical stadia lines are etched wide enough and deep enough to accept a fiber optic.

In one embodiment, chrome or similar material can be deposited into the etched structure so that it is reflective.

In one embodiment, a fiber optic is inserted into the etched structure. The fiber optic provides illumination for the reticle/markings in the transparent substrate.

In one embodiment, the fiber optic is approximately 50 microns in diameter. In one embodiment, the fiber optic is from 25 micron to 100 microns in diameter. In yet another embodiment, the fiber optic is from 50 microns to 75 microns in diameter.

In one embodiment, a first end of optic fiber may optionally include a light collector, which acts as a funnel of sorts to capture as much light as possible. The second end of optic fiber is cut at about a 45° angle, which reflects the light passing through the fiber toward the eye of the user. The fiber optic is inserted into the etched structure such that the 45° cut is in the center of the reticle and oriented so that the light traveling down the fiber optic will reflect off of the chrome structure and then back towards the user's eye.

In one embodiment, the etched pattern is made of open grooves, i.e. grooves that are open to the surface of the substrate, e.g. essentially having a trapezoidal or about V-shaped cross section. The open grooves can be engraved in the front or back surface of the transparent substrate. The engraved open grooves define sidewall or lateral groove surfaces that extend from a bottom of the engraved open grooves to the substrate surface at an angle to the substrate surface in which the open grooves are engraved.

In one embodiment, the groove surfaces have a surface roughness that is large enough to scatter light directed onto the reticle perpendicular to the substrate surface when the reticle is illuminated, such that the pattern becomes visible relative to the remaining flat (not engraved) substrate surface by said light scattering at the groove surfaces when viewed from a direction perpendicular to the substrate surface. In transmission mode the opaque engraved open grooves appear gray, while the remaining or surrounding flat (not engraved) area of the substrate surface is clear and bright and allows to pass an image of the target to the user's eye.

In one embodiment, the grooves are visible in transmission mode by the specific opaqueness of the engraved grooves directly caused by the surface roughness of the groove surfaces. Thus, advantageously it is not necessary to fill the engraved grooves with an intransparent filling material to produce the light scattering of the sighting pattern, e.g. of the crosshairs or the like.

In one embodiment, the engraved open grooves form horizontal and/or vertical lines, e.g. to form crosshairs. Further preferably the grooves have a substantially trapezoidal cross section defined by a bottom and left and right sidewall or lateral groove surfaces. The lateral surfaces of the grooves have a slope angle to the substrate surface in an interval from 40° to 80°, or from 50° to 80°. This provides good visibility of the pattern in transmission and illuminated mode. In one embodiment, the surface roughness of the lateral and bottom surfaces of the engraved open grooves is substantially equal.

What is claimed is:

1. A viewing optic comprising:
   a body with a first end and a second end and having a center axis;
   an objective lens system disposed within the body;
   an eyepiece lens disposed within the body;
   an erector lens system disposed within the body;
   the objective lens system, eyepiece lens, and erector lens system forming an optical system having a first focal plane and a second focal plane; and
   a reticle system having a transparent substrate with a first side facing the objective lens system and a second side facing the eyepiece lens; wherein a first wire reticle is coupled to the first side of the transparent substrate and a second wire reticle is coupled to the second side of the transparent substrate, and further wherein the first wire reticle and/or the second wire reticle has a fiber optic.

2. The viewing optic of claim 1, wherein the transparent substrate further includes at least one subtension marking.

3. The viewing optic of claim 1, wherein the transparent substrate further includes mil dot markings.

4. The viewing optic of claim 1, wherein the transparent substrate further comprises a complete reticle pattern.

5. The viewing optic of claim 1, wherein the first wire reticle has a fiber optic and a light collector at a first end of the fiber optic of the first wire reticle.

6. The viewing optic of claim 5, wherein the second wire reticle has a fiber optic.

7. The viewing optic of claim 5, wherein the fiber optic of the first wire reticle includes a second end having an angled cut wherein light from the light collector reflects off of the angled cut.

8. The viewing optic of claim 1, wherein the reticle system is at the first focal plane.

9. The viewing optic of claim 1, wherein the first wire reticle has an etched horizontal stadia line with a fiber optic.

10. The viewing optic of claim 1, wherein the first wire reticle has an etched vertical stadia line with a fiber optic.

11. The viewing optic of claim 1, wherein the second wire reticle has a fiber optic.

12. The viewing optic of claim 11, wherein the fiber optic of the second wire reticle includes a light collector at a first end.

13. The viewing optic of claim 12, wherein the fiber optic of the second wire reticle includes a second end having an angled cut, wherein light from the light collector reflects off of the angled cut.

14. The viewing optic of claim 11, wherein the second wire reticle has an etched horizontal stadia line with the fiber optic.

15. The viewing optic of claim 11, wherein the second wire reticle has an etched vertical stadia line with the fiber optic.

16. The viewing optic of claim 6, wherein the fiber optic of the second wire reticle includes a light collector at a first end.

17. The viewing optic of claim 16, wherein the fiber optic of the second wire reticle includes a second end having an angled cut, wherein light from the light collector reflects off of the angled cut.

18. The viewing optic of claim 6, wherein the second wire reticle has an etched horizontal stadia line with the fiber optic.

19. The viewing optic of claim 6, wherein the second wire reticle has an etched vertical stadia line with the fiber optic.

* * * * *